United States Patent [19]
Kojima et al.

[11] Patent Number: 6,019,692
[45] Date of Patent: Feb. 1, 2000

[54] BELT DRIVE DEVICE FOR REDUCING BELT LOAD

[75] Inventors: Ichiyo Kojima; Satoshi Imai; Kiyoshi Hatano; Setsuo Nishihara, all of Tokyo, Japan

[73] Assignee: Mitsubishi Jidosha Kogyo Kabushiki Kaisha, Tokyo, Japan

[21] Appl. No.: 08/973,531

[22] PCT Filed: Apr. 21, 1997

[86] PCT No.: PCT/JP97/01362

§ 371 Date: Dec. 9, 1997

§ 102(e) Date: Dec. 9, 1997

[87] PCT Pub. No.: WO97/40291

PCT Pub. Date: Oct. 30, 1997

[30] Foreign Application Priority Data

Apr. 24, 1996 [JP] Japan ................................... 8-102179

[51] Int. Cl.$^7$ .............................. F16H 7/00; F16H 55/14; F16H 7/24; F16C 1/00
[52] U.S. Cl. .............................. 474/87; 474/94; 474/150; 464/52
[58] Field of Search ..................... 474/133, 135, 474/136, 138, 148, 150, 86, 87, 94, 198, 199; 464/51, 52

[56] References Cited

U.S. PATENT DOCUMENTS 5,405,296  4/1995  Cerny et al. ............................ 474/135

FOREIGN PATENT DOCUMENTS

| 4426529A1 | 2/1996 | Germany . |
| 196 20 745A1 | 12/1996 | Germany . |
| 61-198746 U | 12/1986 | Japan . |
| 62-20950 | 1/1987 | Japan . |
| 5288250 | 11/1993 | Japan . |
| 673374 U | 10/1994 | Japan . |
| 175429 | 2/1922 | United Kingdom . |
| 9218754 A1 | 10/1992 | WIPO . |

*Primary Examiner*—Thomas R. Hannon
*Assistant Examiner*—Matthew A. Kaness

[57] ABSTRACT

A belt drive device is constructed by looping a timing belt 14 about a driving sprocket 9, a cam sprocket 11, and a driven sprocket 12 for transmitting a driving force from the driving sprocket 9 to the sprockets 11, 12. A dynamic damper 15, comprising a ring mass 153 and an elastic ring 152 for holding the ring mass 153, is mounted on the driven sprocket 12 that has the largest amplitde of torque fluctuation among the sprockets 11, 12. The dynamic damper 15 absorbs revolution fluctuations of the driven sprocket 12 that has the largest amplitude of torque fluctuation. Thus, at the time of resonance during which the belt load on the timing belt 15 sharply increases, the sharp increase in the timing belt load can be minimized, and maximum load on the timing belt 15 can be decreased, whereby the durability of the timing belt 15 can be secured.

9 Claims, 9 Drawing Sheets

TORQUE FLUCTUATIONS OF A CRANKSHAFT

TORQUE FLUCTUATIONS OF A CAMSHAFT

TORQUE FLUCTUATIONS OF A FUEL INJECTION PUMP

BELT DRIVE DEVICE FOR REDUCING BELT LOAD

This application claims the benefit under 35 U.S.C. §371 of prior PCT International Appliction No. PCT/JP97/01362 which has an International filing date of Apr. 21, 1997 which designated the United States of America, the entire contents of which are hereby incorporated by reference.

TECHNICAL FIELD

The present invention relates to a belt drive device mounted on an engine main unit and capable of transmitting the turning force of a crankshaft on the driving side to a camshaft and other engine accessories on the driven side via an endless toothed belt. More particularly, the invention concerns a belt drive device having a dynamic damper disposed in a revolution transmission system of a timing belt.

BACKGROUND ART

An internal combustion engine, for example, a diesel engine, drives a camshaft and other engine accessories by the turning force of a crankshaft. Usually, the turning force of the crankshaft is transmitted to a fuel injection pump, a balance shaft, and a camshaft via an endless toothed belt.

A timing belt used in this belt drive device undergoes fluctuations in revolution from the camshaft or engine accessories during engine driving. Thus, a load on the timing belt increases or decreases.

For instance, a belt drive device of a diesel engine 100 is shown in FIG. 9. This belt drive device has a revolution transmission system for transmitting a turning force from a crank sprocket 101 to a cam sprocket 103 and a fuel injection pump sprocket 104 via a timing belt 102. The numeral 105 denotes an idler. If the diesel engine 100 is 4-cylindered, torque fluctuations of the crankshaft repeat a fluctuation pattern comprising two explosion torque fluctuations and two inertia torque fluctuations per revolution of the crankshaft as shown in FIG. 10. Torque fluctuations of the camshaft, on the other hand, repeat a specific fluctuation pattern for each cylinder as shown in FIG. 11. Furthermore, torque fluctuations of the fuel injection pump repeat a specific fluctuation pattern per injection as shown in FIG. 12.

Thus, as shown in FIG. 13, revolution fluctuations of the crankshaft follow a line a, revolution fluctuations of the camshaft follow a line b, and revolution fluctuations of the fuel injection pump follow a line c, in the entire revolution speed range of the diesel engine 100. In this case, the load on the timing belt 102 changes as shown in a solid line A on the tension side of the fuel injection pump sprocket 104. Particularly at a predetermined engine speed $Ne_1$, resonance occurs, maximizing the load on the timing belt.

That is, a string such as the timing belt (the tension side of the fuel injection pump sprocket) is known to resonate. At the time of resonance, the load is known to peak. It is also known that its basic resonance frequency is inversely proportional to the length of the string, and is proportional to the square root of the ratio of the tension of the string to the linear density of the string.

With the belt drive device, the timing belt load is thus maximal at resonance. In setting the strength of the timing belt, and for ensuring its durability, therefore, the sectional shape, tension, material, and string vibration interval of the timing belt are suitably set so that the timing belt will have a sufficiently larger allowable limit of load $P_{max}$ than the timing belt load Ph. Besides, the length, tension, and linear density of the string are selected so that the engine speed $Ne_1$ at resonance is excluded from the normal engine speed range. Actually, however, the belt drive device is required to have full durability, and yet is subject to restrictions on layout. The present situation is that sufficiently effective measures cannot be taken.

In reducing the timing belt load of such a belt drive device, it is known to use a dynamic damper. FIG. 14 shows that an inertial body B with the moment of inertia $I_B$ is supported on the substrate side via an elastic body with a spring constant $K_B$, and an inertial body D with the moment of inertia $I_D$ is connected to the inertial body B via an elastic body with a spring constant $K_D$. In this case, the inertial body D vibrating at a torsion angle $\theta_D$ acts as a dynamic damper d on a vibration system b in which the inertial body B vibrates at a torsion angle $\theta_B$.

Basically, if the natural frequency of the dynamic damper d is set at a value equal to the frequency of a vibrating force (torsional vibration) received by the inertial body B, only the dynamic damper d can be caused to vibrate. Actually, the vibration system b vibrating at the torsion angle $\theta_B$, as shown in FIG. 14, is known to produce two resonance peaks p' (see a dashed line in FIG. 15) which are at a lower level than a resonance peak p obtained in the absence of the dynamic damper d. The natural frequency fd of the dynamic damper d at this time is given by the equation (1) below. If the dynamic damper d is prepared such that this natural frequency fd agrees with the resonance frequency of the torsional vibration system b, the torsional vibration of the torsional vibration system b is damped.

$$fd=(1/2\pi)\times\sqrt{(K_D/I_D)} \quad (1)$$

A device using such a dynamic damper to absorb the resonance of a timing belt is disclosed, for example, in Japanese Laid-Open Patent Publication No. 20950/87.

According to the device disclosed in this publication, a dynamic damper is mounted on a camshaft sprocket in order to prevent the situation that a timing belt resonates to cause revolution fluctuations to the camshaft, disordering the ignition timing of an ignition device linked to the camshaft, and eventually lowering engine output.

In this device, when the timing belt vibrates like a string, a tensile force (timing belt load) works on the belt twice per period. In this view, during the resonance of the timing belt, vibrations of a frequency twice the resonance frequency are exerted on the camshaft sprocket side. Thus, the dynamic damper used in the device is one vibrating in a direction opposite to the vibrations of the timing belt and at a natural frequency twice the resonance frequency of the timing belt. Consequently, vibrations of the timing belt are counteracted by vibrations given by the dynamic damper, thereby preventing the disorder of the ignition timing of the ignition device linked to the camshaft.

Incidentally, if, in addition to the camshaft, other engine accessory, such as a fuel injection pump with a high drive torque, is disposed in the revolution transmission system of the belt drive device, the following problem arises:

To achieve improvements in exhaust gas from a diesel engine, there is a growing demand for a finer fuel spray, and an increase in the fuel injection pressure is desired. Thus, the drive torque of the fuel injection pump tends to increase further. As a result, load on the timing belt increases, and the range of torque fluctuations of the fuel injection pump, in particular, widens. This produces a tendency toward a greater load on the timing belt during its resonance.

To ensure the strength of the timing belt, an attempt is made to broaden its sectional shape. However, since there is a restriction to the layout of the engine room, increases in the belt width and thickness pose many problems, and the improvement of the material is also limited. To exclude the resonance frequency from the normal revolution speed range, it is also attempted to use, say, an idler pulley in setting the string vibration interval of the timing belt at a relatively small value. However, exclusion of the resonance frequency from the normal revolution speed range is actually often difficult.

Under these circumstances, a belt drive device capable of dealing with the increase in the belt load on the timing belt is desired.

In a belt drive device as illustrated in FIG. 9, it may be tried to deal with the increase in the load on the timing belt without decreasing the durability of the timing belt. In this case, it is necessary to increase the belt width, etc., but a restriction is imposed on the layout, as stated above.

The belt drive device disclosed in Japanese Laid-Open Patent Publication No. 20950/87 also suppresses belt vibrations by the dynamic damper to reduce torque fluctuations which the camshaft undergoes. Truly, torque fluctuations of the camshaft can be decreased. However, if an engine accessory requiring a greater driving force, such as a fuel injection pump, is disposed in the revolution transmission system of the timing, the belt load on the timing belt on the tension side of the fuel injection pump increases. The belt load at resonance, in particular, sharply increases, posing the problem that full durability of the timing belt cannot be secured.

It is an object of the present invention to provide a belt drive device capable of ensuring the sufficient durability of a timing belt even when a plurality of engine accessories are mounted in the revolution transmission system of the timing belt.

DISCLOSURE OF THE INVENTION

According to the belt drive device of the present invention for attaining the above object, an endless toothed belt is looped between a driving sprocket and a plurality of driven sprockets, for transmitting a driving force from the driving sprocket to the plurality of driven sprockets, and a dynamic damper is mounted on the sprocket that has the largest amplitude of torque fluctuation among the plurality of driven sprockets, the dynamic damper comprising a mass body and an elastic body for holding the mass body. Thus, the dynamic damper absorbs revolution fluctuations of the sprocket that has the largest amplitude of torque fluctuation, thereby minimizing a sharp increase in the timing belt load during resonance, during which the load on the timing belt sharply increases. Consequently, maximum load on the timing belt can be reduced, and the durability of the timing belt can be ensured.

According to the belt drive device of the present invention, moreover, the driven sprocket that has the largest amplitude of torque fluctuation among the plurality of driven sprockets is located on the most tensile side of the endless toothed belt. Thus, the belt load on the timing belt on the tension side of the driven sprocket that has the largest amplitude of torque fluctuation can be decreased.

According to the belt drive device of the present invention, moreover, the driven sprocket that has the largest amplitude of torque fluctuation is the sprocket of a fuel pump, and the sprocket of the camshaft is included in the other driven sprockets. Thus, the load on the timing belt on the tension side of the driven sprocket can be reduced, the durability of the timing belt can be ensured, and high pressure fuel injection by the fuel injection pump can be achieved.

According to the belt drive device of the invention, present moreover, the natural frequency of a belt drive system comprising the driving sprocket, the driven sprockets, and the endless toothed belt is kept constant by spring means fixed at one end, and an idler pulley is provided for adjusting a belt tension to bring this natural frequency into agreement with the natural frequency of the dynamic damper. Thus, the idler pulley maintains the tension on the timing belt at a set value or its tolerance range to match the resonance frequency of the timing belt to the natural frequency of the dynamic damper. Consequently, the resonance damping function of the dynamic damper works certainly, reducing the load on the timing belt, and ensuring the durability of the timing belt.

BEST MODE FOR CARRYING OUT THE INVENTION

Preferred embodiments of the present invention will be described in detail below.

Figure 1:
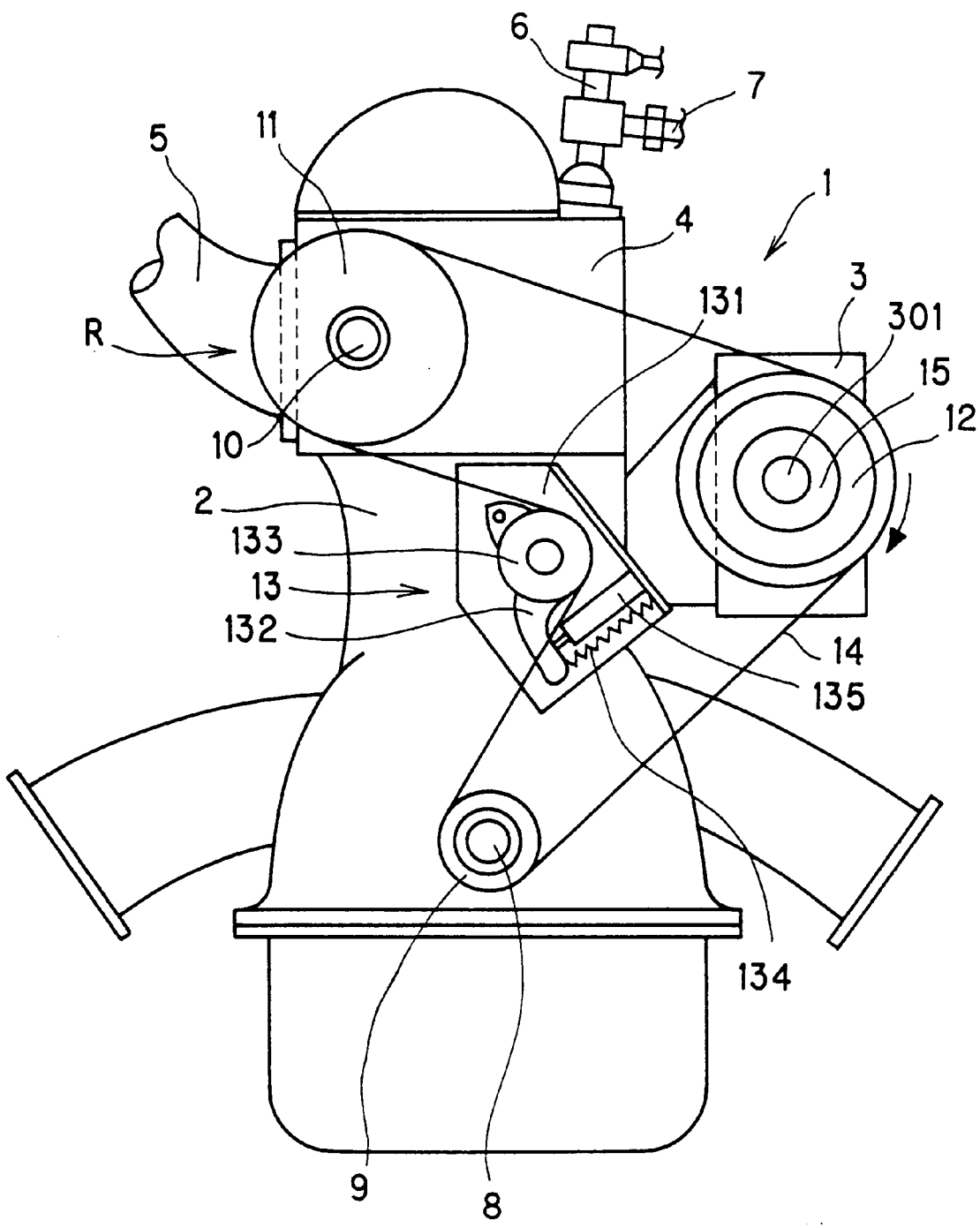
FIG. 1 is a schematic front view of a diesel engine to which a belt drive device related to the first embodiment of the present invention is applied.

FIG. 1 shows a diesel engine 1 to which a belt drive device of the first embodiment is applied. The diesel engine 1 shown in FIG. 1 is an in-line four-cylinder direct injection engine. On the front end face of a cylinder block 2, the belt drive device of this embodiment is mounted. On the side, a distributor type fuel injection pump 3 is mounted. On a cylinder head 4 at the top, intake and exhaust manifolds (only an exhaust manifold 5 is shown in FIG. 1) and fuel injection valves 6 are mounted.

The belt drive device of the instant embodiment has a driving sprocket 9 secured integrally to a crankshaft 8 on the driving side, a cam sprocket 11 secured integrally to a camshaft 10, a driven sprocket 12 secured integrally to a driving shaft 301 of the fuel injection pump 3 and having a built-in dynamic damper 15, an autotensioner 13, and a timing belt 14 looped as a toothed belt about these parts. The belt drive device has such a layout that the distance between the driving sprocket 9 and the driven sprocket 12 is as short as possible.

The fuel injection valves 6 of the diesel engine 1 are deployed for the respective cylinders, and are fed with high pressure fuel from the fuel injection pump 3 via a fuel pipe 7 with a predetermined injection timing.

The driving sprocket 9, cam sprocket 11 and driven sprocket 12 are formed as sprockets with practically the same facewidths as the belt width. The number of the teeth of each of the cam sprocket 11 and the driven sprocket 12 is set at twice the number of the teeth of the driving sprocket 9 secured integrally to a front end portion of the crankshaft 8, thereby driving the accessories at a revolution speed which is a half of the engine speed.

The driven sprocket 12 has the largest apmlitude of torque fluctuation among the engine accessories including the camshaft, and is joined integrally to the fuel injection pump 3 having the greatest revolution fluctuations.

Figure 2:
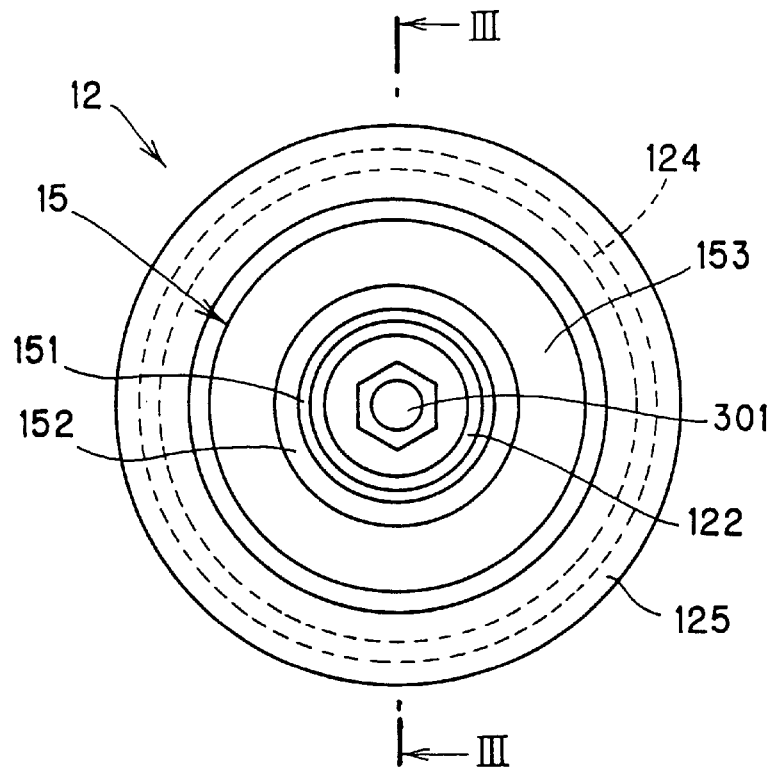
FIG. 2 is a front view of a driven sprocket, used in the belt drive device of this embodiment, for driving a fuel injection pump.
Figure 3:
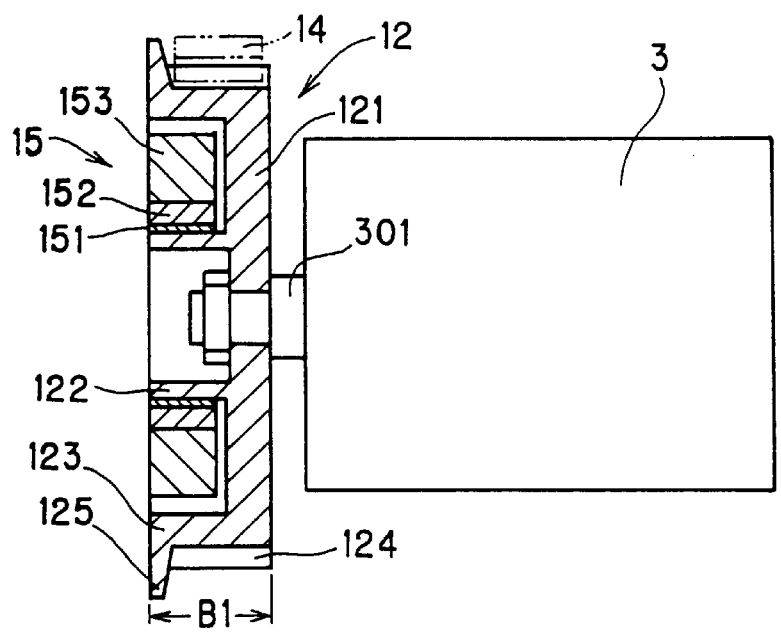
FIG. 3 is a sectional view along line III—III of FIG. 2.

FIGS. 2 and 3 show the driven sprocket for driving the fuel injection pump of the first embodiment. As shown in FIGS. 2 and 3, the driven sprocket 12 has a body 121 whose center is coupled integrally to the driving shaft 301. Between an inner annular portion 122 and an outer annular portion 123, the dynamic damper 15 is disposed. On the entire circumference of the outer peripheral wall of the outer annular portion 123, teeth 124 are formed sequentially. The numeral 125 signifies an annular protrusion for restraining displacing changes of the timing belt 14.

The dynamic damper 15 is composed of a pipe 151 force-fitted onto the outer peripheral surface of the inner annular portion 122, an elastic rubber ring 152 baked onto the pipe 151, and a ring mass 153, as a metallic mass body, baked onto the outer peripheral surface of the elastic ring 152. The dynamic damper 15 can retain durability relatively easily, since the amount of displacement of the elastic ring 152 may be relatively small compared with the amount of displacement of the ring mass 153. The width B1 of the outer annular portion 123 is restricted by the engine layout such that front end portions of the elastic ring 152 and the ring mass 153 (the left side wall surface in FIG. 3) do not project forward of the visible outline of the outer annular portion 123.

The dynamic damper 15 has a natural frequency fd set at a value which counteracts torque fluctuations of the fuel injection pump 3. According to this diesel engine 1, assume that the load on the timing belt 14 was found to vary as indicated by a solid line C in FIG. 7, and to resonate (peak p0) at a predetermined engine speed $Ne_1$. In this case, this 4-cycle 4-cylinder diesel engine 1 has explosions accompanying two fuel injections per revolution of the engine. A resonance frequency Zd generated by the fuel injection pump 3 at the engine speed $Ne_1$ during resonance is given by an equation (2):

$$Zd \approx (Ne_1/60) \times \text{number of cylinders}/2 \quad (2)$$

Thus, the dynamic damper 15 to be adopted for the invention is produced such that this resonance frequency Zd agrees with the natural frequency of the dynamic damper 15. By mounting such dynamic damper 15 on the driven sprocket 12, the belt load follows a dashed line D in FIG. 7, generating relatively low-level resonance peaks p1 and p2, as will be described later on.

Figure 4:
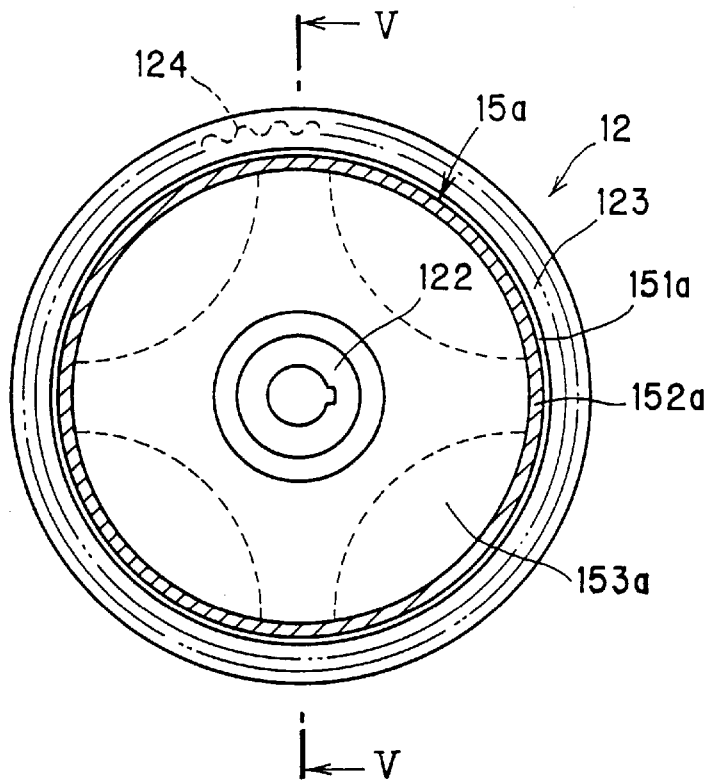
FIG. 4 is a front view of a driven sprocket for driving a fuel injection pump in the second embodiment.
Figure 5:
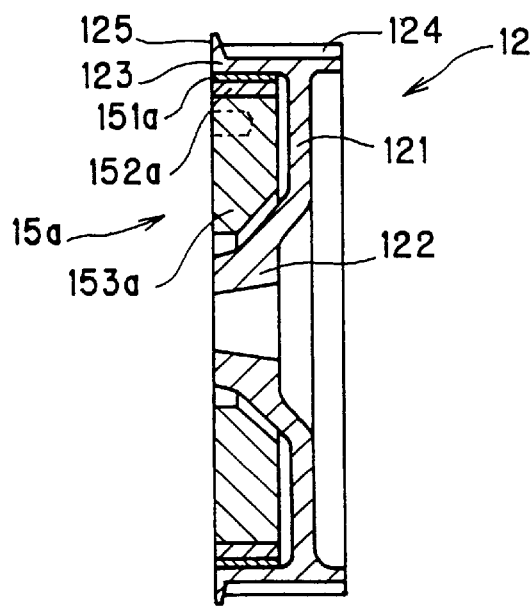
FIG. 5 is a sectional view line V—V of FIG. 4.

In the foregoing first embodiment, the dynamic damper 15 is joined to the inner annular portion 122. Instead, a dynamic damper 15a as illustrated in FIGS. 4 and 5 may be used. FIG. 4 shows a driven sprocket for driving a fuel injection pump in the second embodiment.

As shown in FIGS. 4 and 5, the dynamic damper 15a is disposed between an inner annular portion 122 and an outer annular portion 123 of a driven sprocket 12. The dynamic damper 15a is composed of a pipe 151a force-fitted onto the inner peripheral wall of the outer annular portion 123, an elastic rubber ring 152a baked onto the inner peripheral wall of the pipe 151a, and a ring mass 153a, as a metallic mass body, baked onto the inner peripheral surface of the elastic ring 152a. This dynamic damper 15a is advantageous in that it can accommodate the relatively large ring mass 153a between the inner annular portion 122 and the outer annular portion 123. In this case as well, front end portions of the elastic ring 152a and the ring mass 153a (the left side wall surface in FIG. 5) are formed so as not to project beyond the visible outline of the outer annular portion 123.

Figure 6:
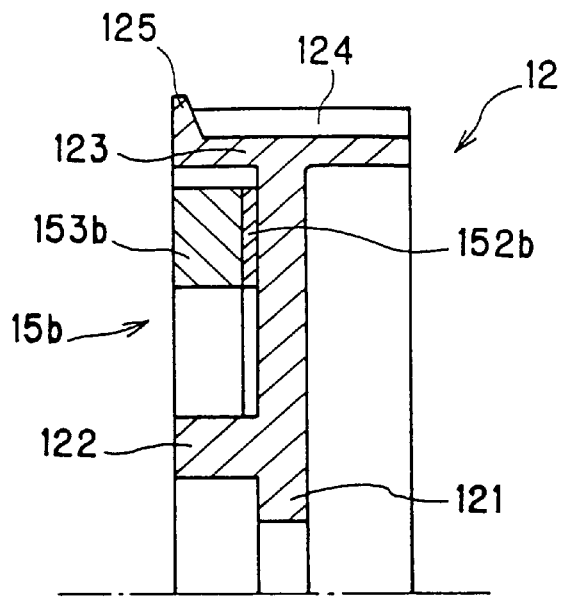
FIG. 6 is a sectional view of the essential part of a driven sprocket for driving a fuel injection pump in the third embodiment.

FIG. 6 shows a driven sprocket for driving a fuel injection pump in the third embodiment. As shown in FIG. 6, a dynamic damper 15b is disposed between an inner annular portion 122 and an outer annular portion 123 of a driven sprocket 12. In particular, an elastic rubber ring 152b is baked onto the inner wall of a body 121, and a ring mass 153b as a metallic mass body, is baked onto the side surface of the elastic ring 152b. This dynamic damper 15b is advantageous in that the elastic ring 152b can be directly baked onto the body 121, so that a force fit operation can be eliminated, and the number of parts can be decreased.

At the center of the front end portion of the cylinder block 2, the autotensioner 13 is mounted, whereby the timing belt 14 in the belt drive device is used in the optimal tension range.

This autotensioner 13 is composed of a base plate 131 fixed to the cylinder block 2, a turning frame 132 pinned at one end to the base plate 131, an idler pulley 133 rotatably attached to the center of the turning frame 132 for rotatably engaging the timing belt 14, a spring 134 engaged in a tensilely urged state between the turning end of the turning frame 132 and the base plate 131, and an oil-actuated damper 135 disposed between the turning end of the turning frame 132 and the base plate 131 for damping vibrations of the rotating frame 132.

Generally, the autotensioner 13 does not sensitively respond to revolution fluctuations, and can maintain a time-average tension at a constant level. These actions are utilized so that the natural frequency of the vibration system of the timing belt 14 can be kept constant on an average. Also, this natural frequency can be brought into agreement with the natural frequency of the dynamic damper 15 set according to the resonance frequency Zd, as stated previously.

Figure 8:
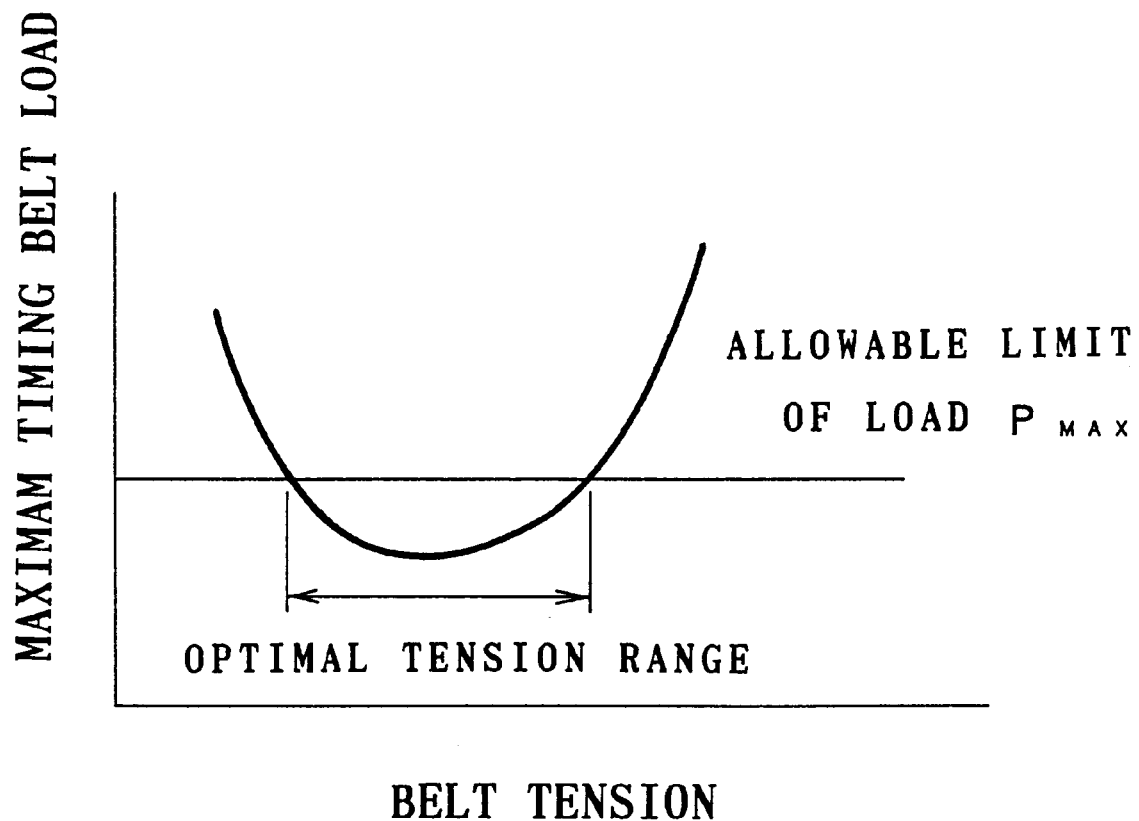
FIG. 8 is a characteristic chart showing the maximum timing belt load versus the belt tension in the belt drive device of this embodiment.
Figure 9:
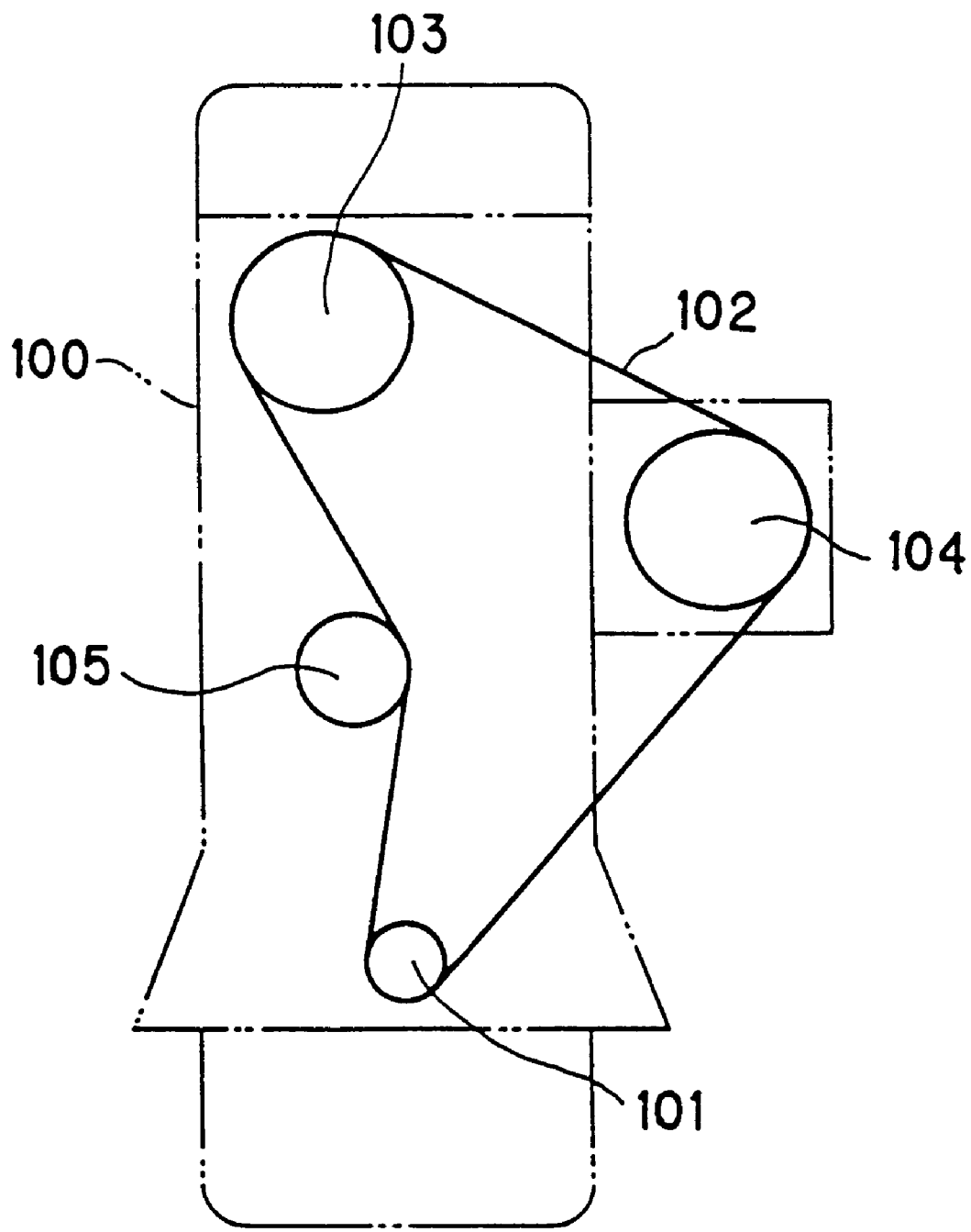
FIG. 9 is a schematic view of an engine to which a conventional belt drive device is applied.
Figure 10:
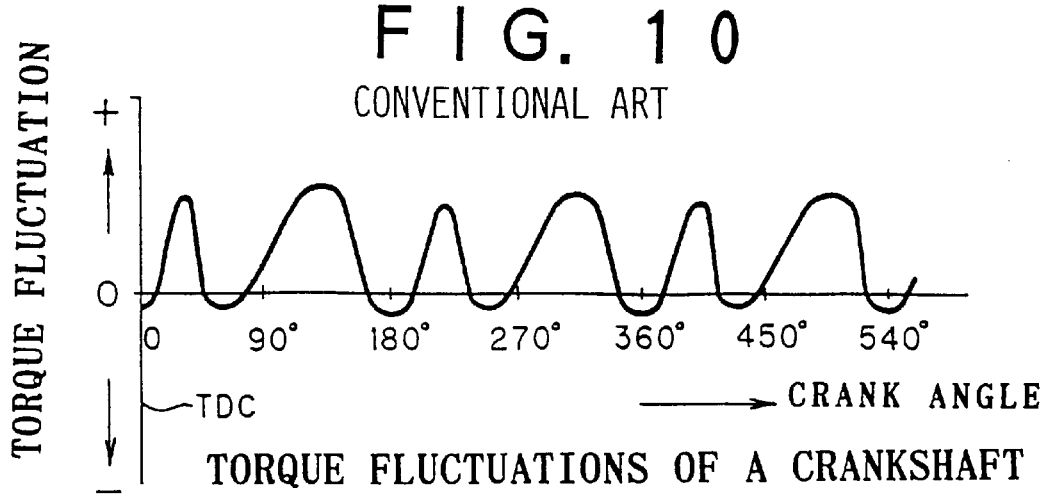
FIG. 10 is a characteristic chart showing torque fluctuations of a crankshaft in a conventional engine.
Figure 11:
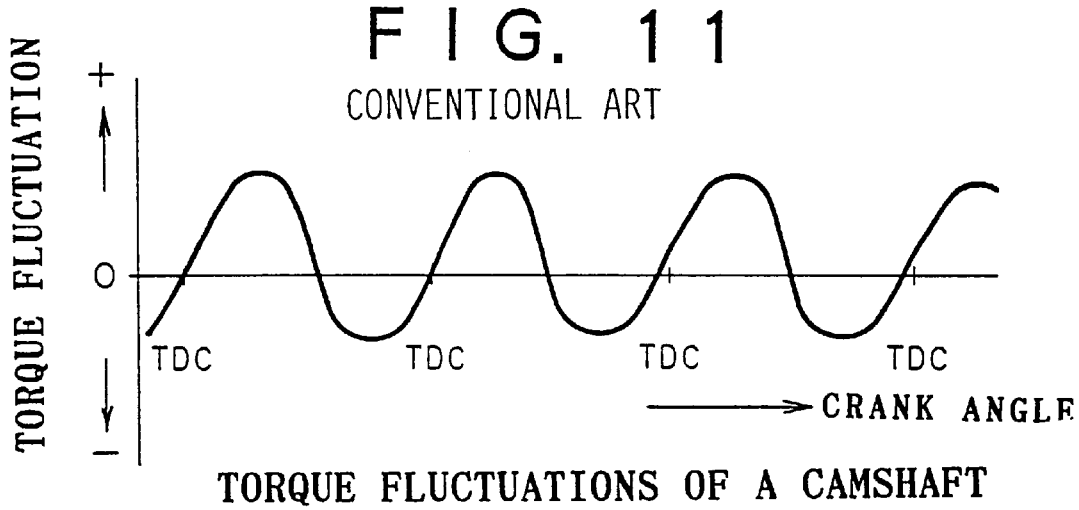
FIG. 11 is a characteristic chart showing torque fluctuations of a camshaft in the conventional engine.
Figure 12:
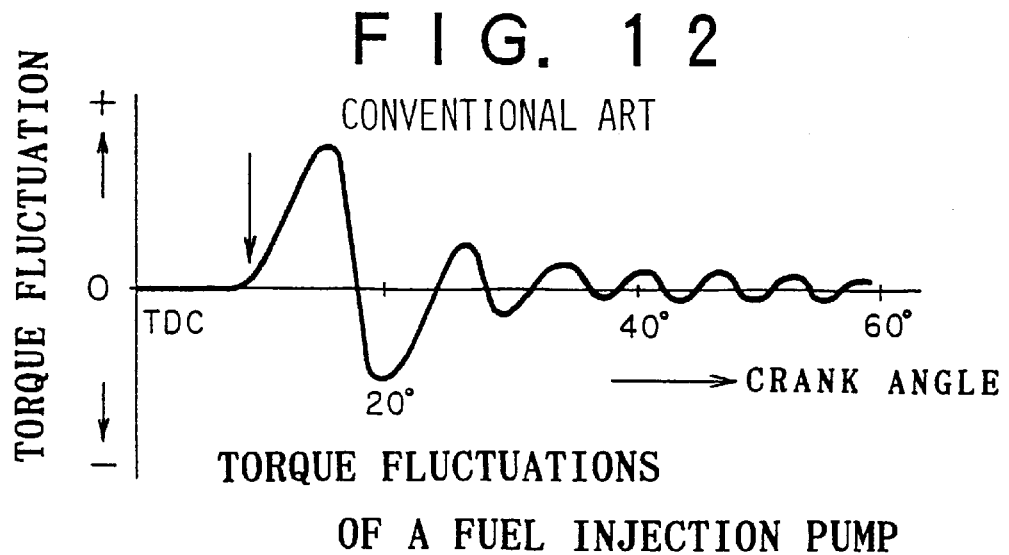
FIG. 12 is a characteristic chart showing torque fluctuations of a fuel injection pump in the conventional engine.
Figure 13:
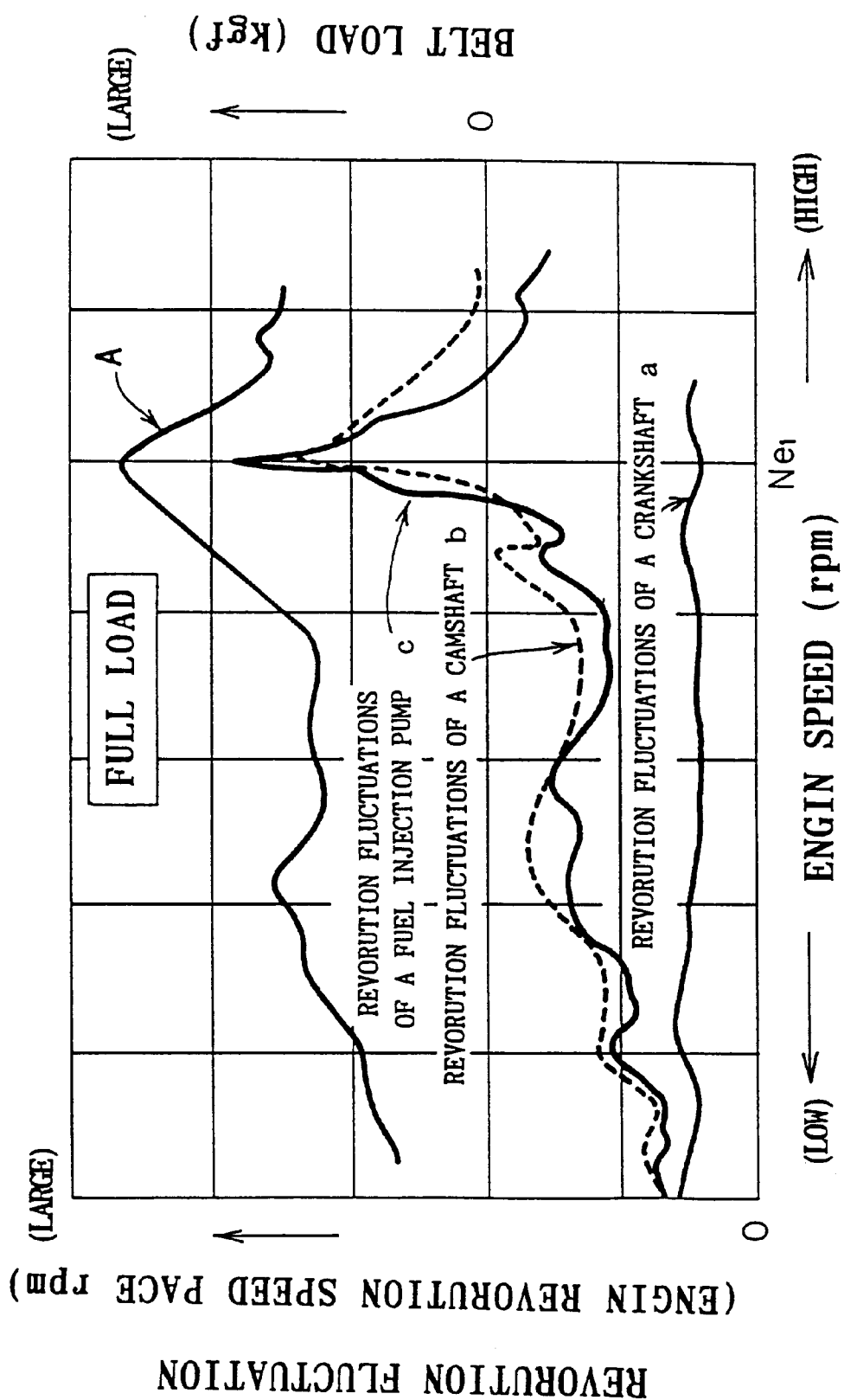
FIG. 13 is a characteristic chart showing revolution fluctuations of engine accessories and the timing belt load in the entire engine speed range of the conventional engine.
Figure 14:
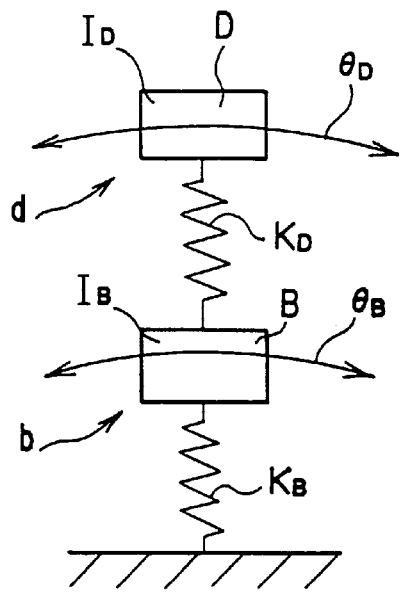
FIG. 14 is a functional concept view of a dynamic damper.
Figure 15:
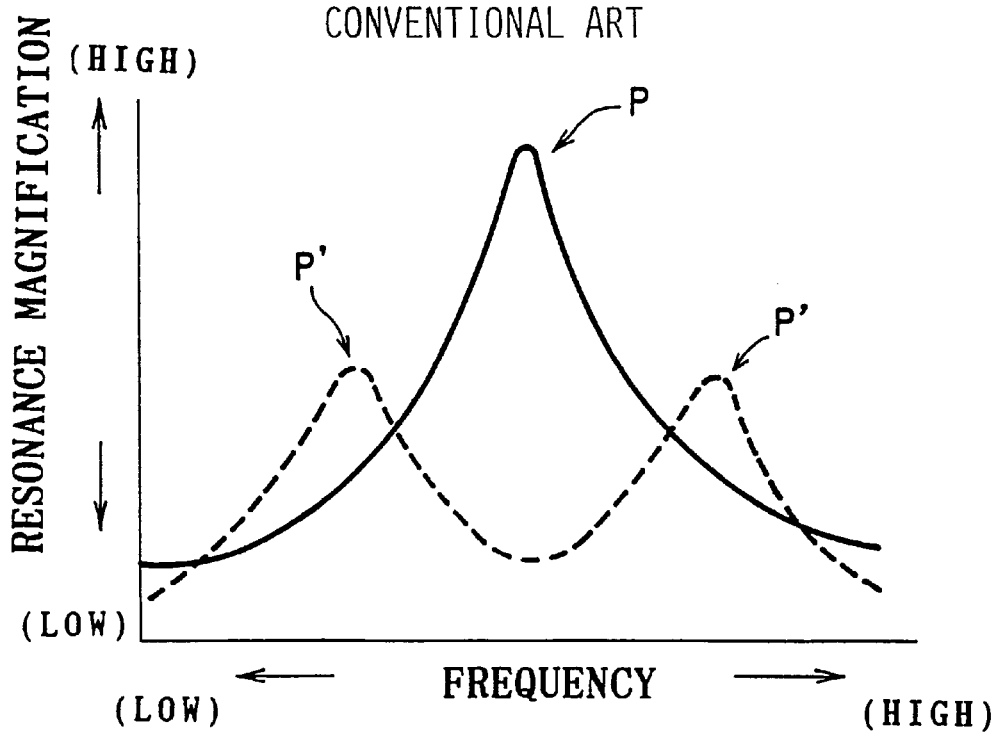
FIG. 15 a resonance characteristic chart of the dynamic damper.

That is, in controlling the resonance frequency of the timing belt 14 (string), it is necessary to maintain the tension on the timing belt 14 at the set value or its tolerance range. Deviation from this value or tolerance range would make the resonance damping function of the dynamic damper 15 fail to work. When the timing belt 14 in the belt drive device is used in the optimum tension range, the natural frequency of the vibration system of the timing belt 14 coincides with the natural frequency of the dynamic damper 15. As a result, the dynamic damper 15 works without fail, and maximum timing belt load exerted on the timing belt 14 acts relatively slightly. This is seen, as shown in FIG. 8, from the fact that when the belt tension is in the optimum tension range, maximum timing belt load falls short of the allowable limit of load $P_{MAX}$, thus improving the durability of the timing belt.

As noted above, the autotensioner 13 maintains the tension of the timing belt 14 at the set value to bring the natural frequency of its vibration system into agreement with the natural frequency of the dynamic damper 15. Thus, the autotensioner 13 acts effectively in making the dynamic damper 15 function properly.

By adjusting the spring constant of the spring 134 of the autotensioner, the tension of the timing belt 14 can be adjusted to the set value, and the natural frequency of its vibration system can be adjusted. To facilitate this tuning work, an adjustor (not shown) for varying the engagement position of the spring may be mounted on the base plate 131 side where the spring 134 is engaged.

The actions of the belt drive device of the foregoing embodiment will be described below.

When the diesel engine 1 is driven, the turning force of the crankshaft 8 on the driving side is transmitted to the camshaft 10 and the fuel injection pump 3 by the revolution transmission system R of the timing belt. As a result, the valve system of the diesel engine 1 is actuated, and the fuel injection pump 3 is driven to actuate the fuel system properly. During this period, the autotensioner 13 works to maintain the timing belt load in the optimum tension range, bringing the natural frequency of the vibration system of the timing belt into agreement with the natural frequency of the dynamic damper 15.

In the fuel injection pump 3 having the greatest revolution fluctuations, therefore, the dynamic damper 15 provided within the driven sprocket 12, integrally joined to its driving shaft 301, can absorb revolution fluctuations during resonance.

Figure 7:
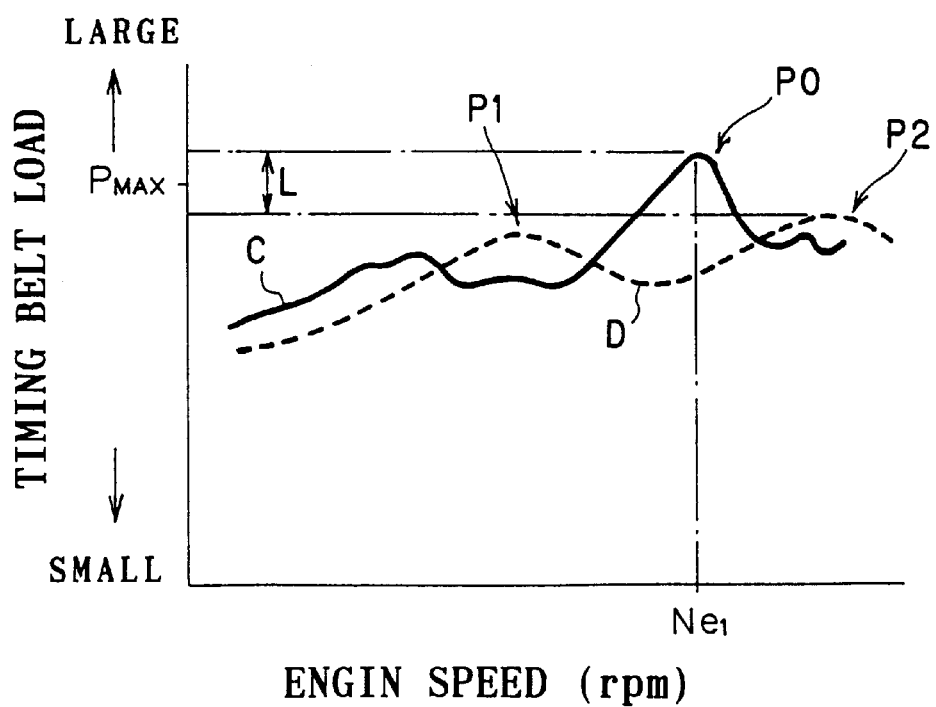
FIG. 7 is a characteristic chart showing the timing belt load versus the engine speed in the belt drive device of this embodiment.

In more detail, at the engine speed $Ne_1$, the fuel injection pump 3 has a resonant revolution speed, reaching the resonance peak p0, as shown in FIG. 7. At this time, the dynamic damper 15 also reaches the resonance frequency Zd, and thus can act to damp the revolution fluctuations of the fuel injection pump 3.

Consequently, in the belt drive device of the instant embodiment, the damping of revolution fluctuations of the fuel injection pump 3 by the dynamic damper 15 result in the reduction of these revolution fluctuations. Thus, as shown in FIG. 7, the timing belt load changes as expressed by the solid line C to reach the resonance peak p0, whereas according to the instant embodiment, the timing belt load changes as expressed by the dashed line D to have the resonance peaks p1, p2. In other words, because of the dynamic damper 15, the resonance peak p0 changes into the resonance peak p1, and also the engine revolution speed range shifts to the slower revolution side, whereby the resonance level can be rendered low. As shown here, the maximum timing belt load decreases by the quantity L in comparison with the case in which the dynamic damper 15 is not mounted (solid line C in FIG. 7). Hence, the load on the timing belt 14 can be prevented from exceeding the allowable limit of load $P_{MAX}$, so that the durability of the timing belt 14 can be secured.

In each of the embodiments described above, the camshaft 10 and the fuel injection pump 3 were provided as engine accessories of the belt drive device. In addition to these parts, there may be a constitution in which other rotating bodies, such as a balance shaft, may be driven simultaneously. In this case, too, the dynamic damper can be integrally joined to the engine accessory that has the largest amplitude of torque fluctuation. By this measure, the dynamic damper can absorb revolution fluctuations of the accessory to decrease the belt load on the timing belt and ensure its durability.

Industrial Applicability

As described above, according to the belt drive device of the present, an endless toothed belt is looped between a driving sprocket and a plurality of driven sprockets, and a dynamic damper is mounted on the sprocket that has the largest amplitude of torque fluctuation, whereby revolution fluctuations of the sprocket are suppressed. This belt drive device, is preferred for use as a belt drive device which is mounted on an engine main unit, and is capable of transmitting the turning force of a crankshaft on the driving side to a camshaft and other engine accessories on the driven side via a timing belt.

What is claimed is:

1. A belt drive device, comprising:
    a driving sprocket;
    a plurality of driven sprockets;
    an endless toothed belt adapted to transmit a driving force from said driving sprocket to said plurality of driven sprockets; and
    a dynamic damper having a mass body and an elastic body for holding the mass body mounted on a predetermined one of said plurality of driven sprockets that has the largest amplitude of torque fluctuation among said plurality of driven sprockets.

2. The belt drive device of claim 1, wherein, among said plurality of driven sprockets, said predetermined one of said plurality of driven sprockets is located on the most tensile side of said endless toothed belt.

3. The belt drive device of claim 1, wherein said predetermined one of said plurality of driven sprockets is the sprocket of a fuel pump, and the sprocket of a camshaft is included in said plurality of driven sprockets.

4. The belt drive device of claim 1, further comprising:
    an autotensioner adapted to adjust tension of said endless toothed belt to maintain the natural frequency of the belt drive system constant, such that the natural frequency is maintained in agreement with the natural frequency of said dynamic damper, said autotensioner including an idler pulley in engagement with said endless toothed belt and a spring unit adapted to apply the tension to said belt through said idler pulley.

5. The belt drive device of claim 1, wherein said driving sprocket is the sprocket for a crankshaft.

6. The belt drive device of claim 1, wherein said predetermined one of said plurality of driven sprockets includes,
    an inner annular portion,
    an outer annular portion, and
    a wall extending between said inner annular portion and said outer annular portion in a radial direction of said predetermined one of said plurality of driven sprockets.

7. The belt drive device of claim 6, wherein said dynamic damper includes,
    a pipe fixedly fitted on an outer peripheral surface of said inner annular portion, and
    an elastic rubber ring fixedly attached to an outer peripheral surface of said pipe, wherein said mass body is fixedly attached to an outer peripheral surface of said elastic rubber ring, and wherein outer surfaces of said mass body is spaced apart from an inner peripheral surface of said outer annular portion and said wall.

8. The belt drive device of claim 6, wherein said dynamic damper includes, a pipe fixedly fitted on an inner peripheral surface of said outer annular portion, and an elastic rubber ring fixedly attached to an inner peripheral surface of said pipe, wherein said mass body is fixedly attached to an inner peripheral surface of said elastic rubber ring, and wherein outer surfaces of said mass body is spaced apart from an outer peripheral surface of said inner annular portion and said wall.

9. The belt drive device of claim 6, wherein said dynamic damper includes, an elastic rubber ring fixedly attached to said wall, wherein said mass body is fixedly attached to said elastic rubber ring, and wherein outer and inner peripheral surfaces of said mass body are spaced apart from an inner peripheral surface of said outer annular portion and an outer peripheral surface of said inner annular portion, respectively.

* * * * *